United States Patent [19]

Iosef et al.

[11] Patent Number: 4,585,636
[45] Date of Patent: Apr. 29, 1986

[54] PROCESS FOR THE MANUFACTURE OF PURIFIED PHOSPHORIC ACID

[75] Inventors: Alexander Iosef; Menachem Bar-on, both of Arad; Jacob Oren, Beer-Sheva; Dagobert Kellerman, Haifa, all of Israel

[73] Assignee: Negev Phosphates Ltd., Dimona, Israel

[21] Appl. No.: 661,710

[22] Filed: Oct. 17, 1984

[51] Int. Cl.$^4$ .............................................. C01B 25/16
[52] U.S. Cl. ............................. 423/321 S; 423/321 R
[58] Field of Search ................... 423/319, 320, 321 R, 423/321 S, 167

[56] References Cited

U.S. PATENT DOCUMENTS

| | | | |
|---|---|---|---|
| 3,410,656 | 11/1968 | Bunin et al. | 423/321 S |
| 3,993,736 | 11/1976 | Irani | 423/321 S |
| 4,018,869 | 4/1977 | Beltz et al. | 423/321 S |
| 4,118,462 | 10/1978 | Desire et al. | 423/321 S |
| 4,256,716 | 3/1981 | Sikdar | 423/321 S |
| 4,341,638 | 7/1982 | Berry et al. | 423/321 R |
| 4,369,169 | 1/1983 | Nineuil et al. | 423/321 R |

Primary Examiner—Gregory A. Heller
Attorney, Agent, or Firm—Morgan, Finnegan, Pine, Foley & Lee

[57] ABSTRACT

The present invention relates to an improved process for the manufacture of purified phosphoric acid from phosphate rock. According to the invention, phosphate rock is decomposed by a mineral acid selected from hydrochloric acid, sulfuric acid or mixtures thereof. The dissolution liquor obtained is reacted with a calcium-containing compound such as calcium oxide, calcium carbonate, tricalcium phosphate and fines of phosphate rock producing an aqueous solution containing monocalcium phosphate in an amount corresponding to between 0.4% to 5.5% by wt CaO. After the separation of the precipitated solids, the clarified solution is extracted by an organic solvent having the property to extract the phosphate component. The phosphoric acid is subsequently recovered from the solvent extract by known methods such as washing or distillation.

10 Claims, No Drawings

PROCESS FOR THE MANUFACTURE OF PURIFIED PHOSPHORIC ACID

The present invention relates to an improved process for the purification of phosphoric acid. More particularly the invention relates to an improved process for the purification of phosphoric acid using solvent extraction technique.

Wet process phosphoric acid, referred to hereinafter by the widely accepted abreviation WPA, is the most abundant source of phosphoric acid. Its manufacture comprises the acidulation of phosphate rock with sulfuric acid followed by the separation of the formed calcium sulfate. The main uses of WPA is in the fertilizer industry wherein in most of the cases, the cation impurities as well as the anion impurities of the phosphoric acid do not interfere in its use. For special uses such as in the feed and in the food industry where strict composition standards are required, the thermal phosphoric acid produced from elemental phosphorus has been utilized. However, thermal phosphoric acid is a very expensive product and would be selected generally for a rather limited number of uses.

In the last twenty years several processes have been developed for the manufacture of purified phosphoric acid using the solvent extraction technique. According to these processes, phosphoric acid is extracted from aqueous solutions of dissolution liquors obtained by decomposition of phosphate rock with hydrochloric acid (e.g. U.S. Pat. No. 2,880,063), nitric acid, mixtures of hydrochloric acid and sulfuric acid (e.g. U.S. Pat. No. 3,338,674) or even directly from WPA (e.g. U.S. Pat. No. 2,885,265), using various groups of organic solvents mostly water-immiscible. The purified phosphoric acids obtained are substantially free of most of the cation impurities and to a certain extent free of anion impurities but still will contain most of the organic matter originally present in the phosphate rock. For various uses this type of purified phosphoric acid can substitute the expensive thermal phosphoric acid. Some examples of such uses are in the manufacture of sodium polyphosphate (detergent industry), metal treatment, dicalcium phosphate as feed additive etc.

In principle the phosphoric acid manufacture using the solvent extraction technique is quite simple: When the aqueous solution of the dissolution liquors is contacted with an organic solvent in the presence of a free acid, phosphoric acid passes into the organic phase. The solvent phase is then separated from the aqueous phase and the resulting solvent extract is washed with water to separate the acids from the solvent extract; the acids are then separated and concentrated and thus phosphoric acid is recovered.

Most of the work carried out on purification of phosphoric acid, as appears from the large number of patents published in the last twenty years, concentrates in describing and claiming various groups of solvents having a particular extraction property and/or a higher extraction power towards the phosphoric acid and/or being less expensive than other solvents.

One of the main disadvantages of the solvent extraction operation applied in the purification of phosphoric acid is connected with the organic matter from the phosphate rock which substantially will accompany the phosphoric acid and thus will be present in the solvent phase. In most of the cases, the organic matter accumulates at the interface between the organic and aqueous phases. In order to avoid difficulties in phase separation, a distillation of said intermediate phase is required from time to time and sometimes even a complete distillation of the organic solvent stock is suggested for a smooth extraction operation. However, this of course will add to the costs of the purification in addition to the burden itself of shut down the plant. Furthermore, the organic matter present in the purified phosphoric acid will impart a dark colour to the product which of course is an obvious disadvantage in most of its uses. One solution which was conceived and even utilized sometimes, is the use of calcined phosphate rock in which a substantial part of the organic matter was removed during the calcination. Although this solution gives good results, it is rather expensive for most of the uses of purified phosphoric acid s.

In contrast to the known prior art patents which looked for various types of organic solvents, the present invention is based on a different approach which improves the entire solvent extraction operation for the purification of phosphoric acid, using any of the known groups of organic solvents. At the same type, the process according to the present invention, alleviates the problem of organic matter in the final product by a substantial decrease of the organic matter content in the phosphoric acid.

It is an object of the present invention to provide an improved process for the purification of phosphoric acid by solvent extraction. It is another object of the present invention to provide an improved process for the purification of phosphoric acid, wherein the $P_2O_5$ extraction officiency is substantially improved. It is yet another object of the present invention to provide an improved integrated process for the purification of phosphoric acid, wherein a substantially part of the organic matter is removed from the purified phosphoric acid. Thus the invention consists in a process for the manufacture recovery of purified phosphoric acid from an aqueous reaction mixture obtained by the decomposition of phosphate rock with a mineral acid selected from sulfuric acid, hydrochloric acid or mixtures thereof which consists in the following steps:

(a) neutralizing the aqueous reaction mixture with a $Ca^{++}$-containing compound, obtaining a solution with a CaO wt content in the range of 0.4% to 5.5%;
(b) separating out the resulting precipitated solids;
(c) extracting the clarified solution obtained in step (b) by a known organic solvent, and
(d) recovering the phosphoric acid from the solvent extract.

The purified phosphoric acid obtained in step (d) can be subsequently concentrated to the desired concentration.

It has been surprisingly found that the neutralization step of the reaction mixture, causes at the same time an appreciable decrease in the organic matter content of the dissolution liquor entering the extraction step. This unexpected feature enables to obtain a substantial advantage to the entire extraction operation, the phase separation occurring spontaneously substantially without solid accumulation at the interface and thus avoiding any emulsification problems. Furthermore, the presence of $Ca^{++}$ in the aqueous solution entering in the extraction step, imparts a substantial improvement to the extent of selectivity. This can be explained by an increase in the distribution coefficient of the $P_2O_5$ towards the organic solvent, thus depressing the extractability of undesirable constituents such as vanadium and sulfate ions.

According to a preferred embodiment, the neutralization of the aqueous reaction mixture is carried out with ground phosphate rock which will at the same time cause an increase in the $P_2O_5$ content of the aqueous solution. As known from the solvent extraction of phosphoric acid, the higher the $P_2O_5$ content a better and more efficient extraction operation will result. In a most preferred embodiment, the neutralization is carried out with fines of phosphate rock (so called cyclone fraction) obtained in the beneficiation of phosphate rock. The cyclone fraction is well-known as a burden to any phosphate rock plant without any practical use. It is rich in lime and limestone and consists of very fine particle size. According to the present invention this cyclone fraction, generally considered as a nuissance, is successfully utilized exploiting completely its $P_2O_5$ content.

The aqueous reaction mixture may be wet process phosphoric acid so called filter acid such as obtained from the decomposition of phosphate rock with sulfuric acid and separating out the resulting gypsum. In the following Table 1 are presented compositions of the WPA filter acid fraction before and after neutralization with cyclone fraction.

TABLE 1

Typical composition of filter acid phosphoric acid before and after neutralization with cyclone fraction.

| Composition | Filter acid phosphoric acid - before neutralization. | Filter acid phosphoric acid after neutralization with cyclone fraction and solids separation |
|---|---|---|
| density (g/cc) | 1.30 | 1.37 |
| % $P_2O_5$ | 28 | 30.5 |
| % $H_2SO_4$ | 2 | — |
| % $SO_4^{--}$ | 2.2 | 0.15 |
| % Monocalcium phosphate | — | 11.4 |
| % CaO | 0.1 | 4.0 |
| % Organic matter | 0.07 | 0.045 |

As appears from the above Table, the neutralization step, imparts an appreciable increase in the $P_2O_5$ content of treated aqueous solution, while at the same time the organic matter content is substantially reduced. It was found that the decrease of about 30% in the organic matter caused a significant improvement in the phase separation during the solvent extraction operation.

The improved process according to the present invention has also another advantage which results from the prior step of neutralization. As appears from the above Table 1 the treated aqueous solution contains a substantial amount of monocalcium phosphate dissolved in the phosphoric acid solution. The improved effect will be maximized by dissolving as much as possible monocalcium phosphate. The limit of the solubility is imposed by the solubility graphs of monocalcium phosphate and dicalcium phosphate as given in the literature. As known in the solvent extraction of phosphoric acid, the organic solvent is loaded with the mineral acid as recycled from the stripping step. Thus when the $H^+$-loaded solvent will contact the mixture of monocalcium phosphate-phosphoric acid, the $H^+$ from the solvent will also convert the monocalcium phosphate into more phosphoric acid which will be immediately extracted by the organic solvent.

A person skilled in the art of phosphoric acid manufacture by solvent extraction will appreciate to its real value the significant advantages incurred by the actual decrease of acidity in the solvent entering for extracting the phosphoric acid, being known that acidity is absolutely required in order to enhance the $P_2O_5$ extractability. In the system according to the present invention, the solvent with the required acidity is introduced in the system, but reacts immediately with the monocalcium phosphate. The advantages inherent to the process resulting from this feature are:

Decrease in the amount of water for washing the solvent extract containing the phosphoric acid and thus providing a more concentrated aqueous solution and therefore reducing significantly the amount of energy required for the concentration operation.

The increase of selectivity towards the $P_2O_5$ extractability, will result in a most purified product being less contaminated with cations such as iron, copper, cadmium, zinc or uranium, which have the tendency to be coextracted in the presence of a strong acidity.

The substantial reduction of the sulfate ion from the aqueous solution as well as of the acidity along the increase in the calcium content, will cause a depression of the sulfate ion entering into the solvent phase, fact which will result a phosphoric acid with a very low sulfate content e.g. only 100 ppm $SO_4^{--}$ for a phosphoric acid of 67% $P_2O_5$. Phosphoric acid of this type is particularly required for several uses such as for metal treatment.

The beneficial effect on extraction efficiency incurred by a high $P_2O_5$ content in the aqueous solution entering into the extraction operation, which is also encountered in the present invention, is already known from previous patents (see for example U.S. Pat. No. 3,433,592). As mentioned therein, it is most desirable to obtain as high a concentration as possible of organic solvent extractable $P_2O_5$ in the reaction mixture formed by the reaction of phosphate rock in a mineral acid, for the reason that the higher the concentration of extractable $P_2O_5$ in the aqueous mixture, the more economical it is to extract and concentrate the resulting phosphoric acid. This is because the volume of fluid to be processed is reduced considerably and therefore the distillation and evaporation apparatus can be much reduced. However no hint whatsoever can be found in the prior art on the eventual use of monocalciumphosphate dissolved in phosphoric acid as starting $P_2O_5$—containing aqueous solution for solvent extraction.

In the following Table 2, are summarized some experiments, which show the influence of monocalcium phosphate dissolved in the aqueous solution, at various levels, on the extractable $P_2O_5$.

TABLE 2

Influence of various levels of monocalcium phosphate on the extractable $P_2O_5$ content in the aqueous solution.

| Exp. No. | Type of $H_3PO_4$ | % $P_2O_5$ (wt) | % CaO (wt) | *MCP (expressed as % $P_2O_5$) | density (g/cm$^3$) | % increase in the extractable $P_2O_5$ |
|---|---|---|---|---|---|---|
| 1 | Filter acid | 28 | 0.4 | — | 1.30 | 0 |

TABLE 2-continued

Influence of various levels of monocalcium phosphate on the extractable $P_2O_5$ content in the aqueous solution.

| Exp. No. | Type of $H_3PO_4$ | % $P_2O_5$ (wt) | % CaO (wt) | *MCP (expressed as % $P_2O_5$) | density (g/cm$^3$) | % increase in the extractable $P_2O_5$ |
|---|---|---|---|---|---|---|
| 2 | Filter acid + neutralization | 28.7 | 1.3 | 3.3 | 1.32 | 4.07 |
| 3 | Filter acid + neutralization | 29.8 | 3 | 7.6 | 1.352 | 10.68 |
| 4 | Filter acid + neutralization | 30.6 | 4 | 10.1 | 1.375 | 15.60 |

*(MCP = monocalcium phosphate).

From the above results it clearly appears the beneficial effect imparted by the presence of monocalcium phosphate in the aqueous solution. Thus when the aqueous solution contains 10.1% monocalcium phosphate, an increase of 15.6% in the extractable $P_2O_5$ is achieved. Moreover, the density of said aqueous solution increases to 1.375 g/cm$^3$, compared to 1.30 for the filter acid solution without neutralization. As known an increase in the density assists in a favourable manner the phase separation between the organic and aqueous phases.

The presence of monocalcium phosphate dissolved in the aqueous solution has also a positive influence or the selectivity of $P_2O_5$ extractability. In the following Table 3, are summarized some experiments which show the beneficial effect on the $P_2O_5$ distribution coefficient(K) and on the coextraction of vanadium and sulfate ions as a function with the level of monocalcium phosphate dissolved in the aqueous solution.

TABLE 3

Selectivity in the extraction of $P_2O_5$ by iso-amyl alcohol as a function of MCP (expressed as CaO) dissolved in the aqueous solution.

| Composition of aqueous solution | | Composition of solvent extract | | | | | | |
|---|---|---|---|---|---|---|---|---|
| % $P_2O_5$ (wt) | % CaO (wt) | $P_2O_5$ (g/l) | HCl (g/l) | V (mg/l) | $SO_4^-$ (mg/l) | $K_{P_2O_5}$ | $P_2O_5/V \times 10^{-3}$ | $P_2O_5/SO_4 \times 10^{-3}$ |
| 29.0 | 4.5 | 93 | 15 | 4.8 | 34 | 0.26 | 19.4 | 2.7 |
| 30.4 | 3.55 | 84 | 15 | 11 | 52 | 0.21 | 7.6 | 1.6 |
| 29.5 | 2.4 | 74 | 15 | 13 | 65 | 0.18 | 5.7 | 1.1 |

The above results show the higher selectivity on the $P_2O_5$ extraction by the organic solvent as a function of the level of monocalcium phosphate dissolved in the aqueous solution. At the same HCl level in the solvent extract, the $P_2O_5$ extractability increases while the V and $SO_4^{--}$ coextracted decrease, as a function of the amount of monocalcium phosphate dissolved in the aqueous solution.

The very low sulfate content, which corresponds also to a very low gypsum content (less than 0.15%) imparts to the aqueous phosphoric acid solution a stable clarity without any solid deposition. As known from wet process phosphoric acid technology, due to its relatively high gypsum content, there is a continuous tendency of solid deposition, mainly gypsum. This stable clarity has also a beneficial effect on the phases separation in the solvent extraction operation since no solid accumulation will occur at the interface between the two phases.

The presence of monocalcium phosphate in the phosphoric acid aqueous solution, decreases the solubility of gypsum in the phosphoric acid. This will explain the very low sulfate content in the aqueous solution of phosphoric acid obtained after neutralization.

The phosphoric acid solution suitable for the process according to the present invention, may be any solution obtained by decomposition of phosphate rock with a mineral acid such as hydrochloric acid or sulfuric acid, having a concentration in the range of between 6% to 50% by weight $P_2O_5$. In particular suitable will be the so called filter acid phosphoric acid containing about 28% by weight $P_2O_5$, obtained by decomposition of phosphate rock with sulfuric acid and removing out the formed gypsum. When hydrochloric acid will be utilized, the dissolution liquor can be admixed with wet process phosphoric acid in order to increase its $P_2O_5$ content to the preferred content of 25% to 35% by wt. The $Ca^{++}$-containing compound to be utilized in the neutralization step may be any calcium compound having neutralizing property such as calcium carbonate, calcium oxide, calcium phosphate (rock phosphate). Of course one of the main requirements of these compounds will be their availability at the plant with minimal costs. In particular suitable, will be fines from cyclone (so called cyclone fraction) available in any beneficiation plant of phosphate rock. The cyclone fraction is characterized by the fineness of the particles (more than 95% are below 270 mesh size Taylor) and thus being very reactive, the neutralization step taking only a few seconds. This fraction has also a low $CO_2$ content as well as low $P_2O_5$ content so that little foaming if any will be encountered.

The organic solvents suitable for the solvent extraction may be selected from all known solvents utilized in the art of phosphoric acid manufacture or purification. Since the process is applicable to a broad range of $P_2O_5$ concentrations in the phosphoric acid solutions, it can be adapted to any organic solvent which requires a particular concentration range. This adaptation can be done by admixing the aqueous phosphoric acid solution with a more concentrated or more diluted solution to obtain the required range.

The particular solvents used in the process may be ascertained by reference to data on the mutual miscibility of solvents and water, which is well known in the art and is available from literature, e.g. Seidell, Solubilities of Organic Compounds 3rd Edition, Vol. II, 1941, D.Van Norstrand Co., Inc. New York, and Landolt-Bornstein, Physikalische Tabellen, 1912, Julius Springer, Berlin, Germany. Representative solvents coming within the above definition are, for example, lower aliphatic alcohols and ketones of limited mutual miscibility with water, such as alcohols containing four to six carbon atoms in the aliphatic group, used alone or in mixture e.g. butanol, amyl alcohol, isoamyl alcohol, certain amides such as described in the U.S. Pat. No. 3,304,157, trialkyl phosphates, particularly those containing two to eight carbon atoms in the individual alkyl groups, such as tributyl phosphate and mixtures thereof and certain organic amines such as described in the U.K. Pat. No. 1,091,931.

The process is very simple and can be easily incorporated in any plant of phosphate rock beneficiation and processing thereof. Phosphate rock and the mineral acid are fed to a digestor and reacted. When the mineral acid is hydrochloric acid, some wet process phosphoric acid is added in order to increase the $P_2O_5$ content of the aqueous solution. According to another embodiment, separate streams of hydrochloric acid and sulfuric acid are directed simultaneously into the vessels containing the rock, or alternatively, a stepwise addition of acids is possible. In the latter case, sulfuric acid is directed into the digestor containing the phosphate rock followed by the addition of hydrochloric acid to the same reactor. The hydrochloric acid may be added any time after the addition of the sulfuric acid. The order of mineral acids to phosphate rock is not critical, and such addition may, in fact, be reversed. The aqueous reaction mixture with the required range of $P_2O_5$, after the solid separation resulting in the acidulation of phosphate rock, is further treated using the steps according to the present invention. In the first step, the aqueous solution is neutralized with Ca-containing compound such as lime, calcium carbonate, phosphate rock and most preferably with the cyclone fraction of fines resulting from phosphate rock beneficiation. When the phosphate rock is particularly lean in silica, other known additives generally utilized to assist the evolution of fluorine in the form of silicon tetrafluoride or solid fluosilicate may be incorporated. Typical examples of such additives are bentonite, clay, silica etc. The neutralization takes place rapidly and after a few minutes, the solids can be separated. Any known method of solid separation is applicable such as sedimentation, thickening, centrifugation or filtration. The clarified solution obtained is characterized by a very low sulfate content as well as by its lower organic matter content compared with the entering aqueous solution. The solvent extraction operation is carried out using the normal procedure of phosphoric acid recovery with the selected organic solvent as described in various prior patents such as U.S. Pat. Nos. 2,880,063 and 3,433,592.

While the invention will now be fully described in connection with certain preferred embodiments in the following Examples, it will be understood that it is not intended to limit the invention to these particular embodiments. On the contrary, it is intended to cover all alternatives, modifications and equivalents as may be included within the scope of the invention as defined by the appended claims. Thus the following Examples which include preferred embodiments will serve to illustrate the practice of this invention, it being understood that the particulars described are by way of example and for purposes of illustrative discussion of preferred embodiments of the present invention only and are presented to provide what is believed to be the most useful and most readily understood description of the procedure as well as of the principles and conceptual aspects of the invention.

In the specification and Examples presented below the percentages are by weight unless otherwise stated.

EXAMPLE 1

An amount of 1000 kg. wet process phosphoric acid with the composition: 28.4% $P_2O_5$, 1.3% free acid (as $H_2SO_4$) and d=1.3 g/cm$^3$ (at 25° C.) was introduced in a reactor provided with a stirrer. To the same reactor, an amount of 20 kg clay (Machtesh Ramon, containing 46% $SiO_2$) and 102.5 kg of cyclone fraction-phosphate rock were added. The composition of the cyclone fraction was as follows: 33.2% $P_2O_5$; 45.26% CaO (bound to $P_2O_5$ and $CO_2$); 4.7% $CO_2$ and 0.6% $H_2O$. The size distribution of said fraction was: 4.6% of +100 mesh; 26.8% of −100+230 mesh, 12.7% of −230+325 mesh and 55.9% of −325 mesh.

The slurry was stirred for two hours, the temperature being about 60° C. After thickening at 50° C. overnight, 812 kg of clarified solution was separated, its composition being 30.7% $P_2O_5$; 3.9% CaO and 0.15% $SO_4^{--}$ while its density was 1.376 g/cm$^3$. The solids which settled out amounted to 310 kg and were recycled to the wet process phosphoric acid plant.

Clarified phosphoric acid solution obtained as above was conveyed to a laboratory solvent extraction battery which consisted of 15 mixer-settlers units, and fed at a throughput of 390 ml/h, counter currently to 1680 ml/h of isoamyl alcohol charged with 46 g/l HCl. At steady state, the solvent extract contained 105 g/l $P_2O_5$ and 14 g/l HCl. The solvent extract was subsequently purified by contacting countercurrently with 150 ml/h of purified phosphoric acid. The purified solvent extract obtained contained 111 g/l $P_2O_5$, while the cations impurities sharply decreased; thus it contained only 1 mg/l $Ca^{++}$ compared with 662 mg/l in the original solvent extract. After washing with deionized water, the aqueous phosphoric acid obtained contained 316 g/l $P_2O_5$ and had a density of 1.238 g/cm$^3$. A complete analysis of this phosphoric showed the following constituents:

| $Ca^{++}$ | 3.4 mg/l | $Cd^{++}$ | 1.7 mg/l | $F^-$ | 522 mg/l |
|---|---|---|---|---|---|
| $Zn^{++}$ | 92 mg/l | $V^{+++}$ | 1.0 mg/l | Si | 82 mg/l |
| $Fe^{++}$ | 34 mg/l | $Mg^{++}$ | 0.5 mg/l | Pb | 0 |
| $Cu^{++}$ | 9 mg/l | $SO_4^{--}$ | 50 mg/l | V | 1.0 mg/l |

By distillation, phosphoric acid product of 67% $P_2O_5$ was obtained.

If desired, the phosphoric acid can be further purified to remove even the small amounts of cations impurities (Cu, Fe, Zn, Cd) using the method such as described in our previous Israeli Pat. No. 46069. Also, the fluorine can be expelled out by stripping with steam. The colour of the product can reach even a substantial water white one by treatment with an oxidizing agent as known in the art. A typical analysis of the substantial "Water white" purified phosphoric acid product is hereinafter given:

| | | | | | | |
|---|---|---|---|---|---|---|
| $P_2O_5$ | 69.7% | Fe | 4 ppm | Cu | 0.28 ppm |
| Ca | 12 ppm | Mg | 2 ppm | V | 2.5 ppm |
| Zn | 16 ppm | Ca | 0.15 ppm | $SO_3$ | 150 ppm |
| Cl | 5 ppm | F | 30 ppm | Cd | 0.15 ppm |

EXAMPLE 2

An amount of 2 kg of wet process phosphoric (filter acid) with the following composition: 29.4% $P_2O_5$, 2.3% free acid (as $H_2SO_4$) and density 1.314 (at 25° C.), was introduced in a small reactor provided with a mixer. Subsequently, an amount of 232 g of enriched phosphate rock (34% $P_2O_5$, 4.6% $CO_2$ and 46.08% CaO—bound to $P_2O_5$ and $CO_2$—) was added. The size particles of the enriched phosphate rock was as folows:

| | | | |
|---|---|---|---|
| +20 mesh | 0.8%; | −20 + 60 mesh | 33.6%; |
| −60 + 100 mesh | 30.9%; | −100 + 200 mesh | 22.7%; |
| −200 mesh | 12.0%; | | |

The mixing was conducted for 3 hours, the temperature being about 60° C. The calcium content in the supernatant liquor was determined after 95 minutes, 120 minutes and 180 minutes being as follows:

After 95 minutes: 3.46% CaO
After 120 minutes: 3.48% CaO
After 180 minutes: 3.48% CaO The calculated CaO is 3.85 which means that a yield of 90.4% conversion was achieved. After settling overnight at 50° C., a clarified solution was separated, which contained 31.2% $P_2O_5$ (compared to a theoretical content of 31.4% $P_2O_5$) and 3.7% CaO (compared to a theoretical content of 3.85% CaO).

The treated phosphoric acid solution obtained above, was purified by solvent extraction using isoamyl alcohol, in the same manner as described in Example 1.

EXAMPLE 3

In this experiment the neutralization of the filter acid (wet process phosphoric acid) was performed with finely ground calcium carbonate (56% CaO) with a particle size: 80% of −200 mesh. The composition of the filter acid used was: 29.1% $P_2O_4$; 0.1% CaO; 2.06% total $SO_4^{--}$ and 1.89% free $H_2SO_4$.

The neutralization was conducted as described in Example 2, using 1000 g of the filter acid and 71.4 g of the limestone. The mixture was agitated for 2 hours at 60° C. and left overnight. The clarified solution amounted to 1005.2 g and had the following composition: 28.95% $P_2O_5$; 3.98% CaO and 0.14% $SO_4^{--}$.

The purification of the clarified phosphoric acid solution was carried out by solvent extraction using isoamyl alcohol as described in Example 1.

EXAMPLE 4

In this experiment, a dissolution liquor obtained by decomposition of phosphate rock with aqueous hydrochloric acid was utilized. The composition of the dissolution liquor was as follows: 79 g/l $P_2O_5$ and 11 g/l HCl.

An amount of 1000 g of the dissolution liquor was mixed with 43.5 g of the cyclone fraction of phosphate rock as utilized in Example 1, at a temperature of about 70° C. for 1 hour.

The composition of the clarified phosphoric acid solution was 93 g/l $P_2O_5$ and 26 g/l monocalcium phosphate. The purification of this phosphoric acid solution was carried out by solvent extraction using isoamyl alcohol as described in Example 1.

We claim:

1. A process for the recovery of purified phosphoric acid from an aqueous reaction mixture obtained by the decomposition of phosphate rock with a mineral acid selected from sulfuric acid, hydrochloric acid or mixtures thereof, which consists of the steps:

(a) reacting the aqueous solution mixture with a $Ca^{++}$-containing compound in an amount sufficient to obtain a clarified solution which contains between 2% and 12% (expressed as $P_2O_5$) monocalcium phosphate dissolved therein after resulting precipitated solids are separated out;

(b) separating out the resulting precipitated solids;

(c) extracting phosphoric acid from the clarified solution obtained in step (b) with an organic solvent capable of extracting phosphoric acid from aqueous solutions said organic solvent being selected from the group consisting of lower aliphatic alcohols and ketones, trialkyl phosphates, organic amines, amides, or mixtures thereof and (d) recovering the phosphoric acid from the solvent extract.

2. A process according to claim 1, wherein step (a) is carried out with a reagent selected from the group consisting of CaO, $CaCO_3$, tricalcium phosphate and fines of phosphate rock separated by a cyclone during the beneficiation of phosphate rock.

3. A process according to claim 1, wherein the aqueous solution after step (a) has a CaO content in the range of 1% to 4.5% by weight.

4. A process according to claim 1, wherein the separation of solids from step (a) is performed by sedimentation, thickening, centrifugation or filtration.

5. A process according to claim 1, wherein during step (a) some of the organic matter present in the aqueous solution is removed together with the solids precipitating out.

6. A process according to claim 1, wherein the aqueous reaction mixture has a $P_2O_5$ content in the range of 6% to 50% by weight.

7. A process according to claim 6, wherein the aqueous reaction mixture is filter acid of wet process phosphoric acid.

8. A process according to claim 1, wherein the aqueous solution of phosphoric acid, after separating out the solids resulting from step (a), contains 30% by weight $P_2O_5$.

9. A process according to claim 7, wherein the aqueous solution containing the monocalcium phosphate is contacted with $H^+$-loaded organic solvent, whereby said monocalcium phosphate is transformed into $H_3PO_4$ and subsequently extracted by said organic solvent.

10. A process according to claim 1 wherein the mineral acid comprises sulfuric acid or a mixture of sulfuric acid and hydrochloric acid and the phosphoric acid extracted from the clarified solution is substantially free of sulfuric acid.

* * * * *